United States Patent
Kirby et al.

(10) Patent No.: US 8,999,457 B2
(45) Date of Patent: *Apr. 7, 2015

(54) METHODS FOR MAKING ENVIRONMENTAL BARRIER COATINGS USING SINTERING AIDS

(75) Inventors: Glen Harold Kirby, Cincinnati, OH (US); Brett Allen Boutwell, Cincinnati, OH (US); Jessica L. Subit, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 12/642,270

(22) Filed: Dec. 18, 2009

(65) Prior Publication Data

US 2011/0027484 A1 Feb. 3, 2011

Related U.S. Application Data

(60) Provisional application No. 61/230,254, filed on Jul. 31, 2009.

(51) Int. Cl.
*B05D 3/00* (2006.01)
*B29C 71/02* (2006.01)
(Continued)

(52) U.S. Cl.
CPC .............. *C04B 41/52* (2013.01); *C04B 41/009* (2013.01); *C04B 41/89* (2013.01)

(58) Field of Classification Search
CPC .............. C04B 41/4537; C04B 41/455; C04B 41/4582; C04B 41/52; C04B 41/89

USPC ......... 427/140, 189, 191, 192, 193, 532, 540, 427/541

See application file for complete search history.

(56) References Cited

U.S. PATENT DOCUMENTS

| 5,512,522 A | 4/1996 | Yeckley |
| 5,985,368 A | 11/1999 | Sangeeta et al. |

(Continued)

FOREIGN PATENT DOCUMENTS

| GB | 2012309 A | 7/1979 |
| JP | 54101809 A | 8/1979 |

(Continued)

OTHER PUBLICATIONS

Unofficial English translation of Office Action issued in connection with corresponding JP Application No. 2010-169896 on Mar. 4, 2014.

(Continued)

*Primary Examiner* — Michael Wieczorek
(74) *Attorney, Agent, or Firm* — General Electric Company; Brian P. Overbeck

(57) ABSTRACT

Methods for making an environmental barrier coating using a sintering aid involving: applying a bond coat layer to the ceramic component; combining at least water and a primary transition material selected from a rare earth disilicate or a doped rare earth disilicate to produce a transition layer slurry; applying at least the transition layer slurry, and optionally an outer layer slurry and/or compliant layer slurry to the component; and sintering the component to produce the environmental barrier coating. The sintering step causes a reaction between a slurry sintering aid and constituents of at least one of the transition, outer and compliant layers to form a secondary material and reduce porosity in the coating.

41 Claims, 2 Drawing Sheets

(51) Int. Cl.
*C04B 41/52* (2006.01)
*C04B 41/00* (2006.01)
*C04B 41/89* (2006.01)

(56) References Cited

U.S. PATENT DOCUMENTS

| | | | |
|---|---|---|---|
| 6,294,261 B1 * | 9/2001 | Sangeeta et al. | 428/469 |
| 6,444,335 B1 | 9/2002 | Wang et al. | |
| 6,644,917 B2 | 11/2003 | Zhao et al. | |
| 6,645,649 B2 | 11/2003 | Tanaka et al. | |
| 6,759,151 B1 * | 7/2004 | Lee | 428/701 |
| 6,933,061 B2 | 8/2005 | Nagarej et al. | |
| 7,368,164 B2 | 5/2008 | Stowell et al. | |
| 7,740,960 B1 | 6/2010 | Zhu et al. | |
| 2006/0014029 A1 | 1/2006 | Saak et al. | |
| 2006/0029733 A1 | 2/2006 | Bhatia et al. | |
| 2006/0280954 A1 * | 12/2006 | Spitsberg et al. | 428/446 |
| 2007/0014996 A1 | 1/2007 | Bhatia et al. | |
| 2007/0111013 A1 | 5/2007 | Bhatia et al. | |
| 2007/0207330 A1 * | 9/2007 | Tulyani et al. | 428/472 |
| 2008/0026248 A1 * | 1/2008 | Balagopal et al. | 428/688 |
| 2009/0162533 A1 | 6/2009 | Kirby et al. | |
| 2009/0162561 A1 | 6/2009 | Kirby et al. | |
| 2009/0162632 A1 | 6/2009 | Kirby et al. | |
| 2009/0274850 A1 | 11/2009 | Bhatie et al. | |
| 2009/0297718 A1 | 12/2009 | Sarrafi-Nour et al. | |
| 2010/0119718 A1 | 5/2010 | Tulyani et al. | |
| 2010/0255260 A1 | 10/2010 | Lee et al. | |
| 2011/0027470 A1 | 2/2011 | Kirby et al. | |

FOREIGN PATENT DOCUMENTS

| | | |
|---|---|---|
| JP | 6067601 A | 4/1985 |
| JP | 09110533 A | 4/1997 |
| JP | 2003002752 A | 1/2003 |
| JP | 2007229704 A | 9/2007 |
| JP | 2008186660 A | 8/2008 |
| JP | 20088308374 A | 12/2008 |
| JP | 2009137790 A | 6/2009 |
| JP | 2009149489 A | 7/2009 |
| JP | 2009149491 A | 7/2009 |

OTHER PUBLICATIONS

Unofficial English translation of Office Action issued in connection with corresponding JP Application No. 2010-169897 on Sep. 16, 2014.

Unofficial English translation of Office Action issued in connection with corresponding JP Application No. 2010-169898 on Sep. 16, 2014.

Unofficial English translation of Office Action issued in connection with corresponding JP Application No. 2010-169899 on Sep. 16, 2014.

* cited by examiner

METHODS FOR MAKING ENVIRONMENTAL BARRIER COATINGS USING SINTERING AIDS

CROSS REFERENCE TO RELATED APPLICATIONS

This Application claims priority to U.S. Provisional Application Ser. No. 61/230,254, filed Jul. 31, 2009, which is herein incorporated by reference in its entirety.

TECHNICAL FIELD

Embodiments described herein generally relate to methods for making environmental barrier coatings using sintering aids suitable for use with high temperature components.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight component materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. These ceramic materials are lightweight compared to superalloys yet can still provide strength and durability to the component made therefrom. Therefore, such materials are currently being considered for many gas turbine components used in higher temperature sections of gas turbine engines, such as airfoils (e.g. turbines, and vanes), combustors, shrouds and other like components that would benefit from the lighter-weight and higher temperature capability these materials can offer.

CMC and monolithic ceramic components can be coated with environmental barrier coatings (EBCs) to protect them from the harsh environment of high temperature engine sections. EBCs can provide a dense, hermetic seal against the corrosive gases in the hot combustion environment, which can rapidly oxidize silicon-containing CMCs and monolithic ceramics. Additionally, silicon oxide is not stable in high temperature steam, but rather, can be converted to volatile (gaseous) silicon hydroxide species. Thus, EBCs can help prevent dimensional changes in the ceramic component due to such oxidation and volatilization processes. Unfortunately, there can be some undesirable issues associated with standard, industrial coating processes such as plasma spray and vapor deposition (i.e. chemical vapor deposition, CVD, and electron beam physical vapor deposition, EBPVD) currently used to apply EBCs.

Accordingly, there remains a need for methods for making environmental barrier coatings to protect CMCs from the high temperature steam environments present in gas turbine engines.

BRIEF DESCRIPTION OF THE INVENTION

Embodiments herein generally relate to methods for making an environmental barrier coating using a sintering aid comprising: applying a bond coat layer to the ceramic component; combining at least water, a primary transition material comprising a rare earth disilicate, or a doped rare earth disilicate, and at least one slurry sintering aid to produce a transition layer slurry; combining at least water, and a primary outer material comprising a rare earth monosilicate or a doped rare earth monosilicate to produce an outer layer slurry; combining at least water, and a primary compliant material comprising BSAS or a rare earth doped BSAS to produce a compliant layer slurry; applying at least the transition layer slurry, and any one or more of the outer layer slurry, and the compliant layer slurry to the component; and sintering the component to produce the environmental barrier coating having at least the bond coat layer, a transition layer and any of an outer layer or a compliant layer wherein a reaction between the primary materials and the slurry sintering aid results in the transition layer comprising a porosity of from 0% to about 15% by volume of the transition layer, the outer layer comprising a porosity of from 0% to about 30% by volume of the outer layer, and the compliant layer comprising a porosity of from about 0% to about 30% by volume of the compliant layer.

Embodiments herein also generally relate to methods for making an environmental barrier coating using a sintering aid comprising: applying a bond coat layer to the ceramic component; combining at least water, a primary transition material comprising a rare earth disilicate, or a doped rare earth disilicate, and two slurry sintering aids to produce a transition layer slurry; combining at least water, and a primary outer material comprising a rare earth monosilicate or a doped rare earth monosilicate to produce an outer layer slurry; combining at least water, and a primary compliant material comprising BSAS or a rare earth doped BSAS to produce a compliant layer slurry; applying at least the transition layer slurry, and any one or more of the outer layer slurry, and the compliant layer slurry to the component; and sintering the component to produce the environmental barrier coating having at least the bond coat layer, a transition layer and any of an outer layer or a compliant layer wherein a reaction between the primary materials and the slurry sintering aid results in the transition layer comprising a porosity of from 0% to about 15% by volume of the transition layer, the outer layer comprising a porosity of from 0% to about 30% by volume of the outer layer, and the compliant layer comprising a porosity of from about 0% to about 30% by volume of the compliant layer.

Embodiments herein also generally relate to methods for making an environmental barrier coating using a sintering aid comprising: applying a bond coat layer to the ceramic component; combining at least water, and a primary transition material comprising a rare earth disilicate, or a doped rare earth disilicate to produce a transition layer slurry; combining at least water, and a primary outer material comprising a rare earth monosilicate or a doped rare earth monosilicate to produce an outer layer slurry; combining at least water, and a primary compliant material comprising BSAS or a rare earth doped BSAS to produce a compliant layer slurry; applying at least the transition layer slurry, and any of the outer layer slurry, and the compliant layer slurry to the component; sintering the component to produce the environmental barrier coating having at least the bond cost layer, a transition layer and any of an outer layer or a compliant layer wherein at least one of the transition layer, the outer layer, or the compliant layer further comprises at least one slurry sintering aid and wherein a reaction between the primary materials and the slurry sintering aid results in the transition layer comprising a porosity of from 0% to about 15% by volume of the transition layer, the outer layer comprising a porosity of from 0% to about 30% by volume of the outer layer, and the compliant layer comprising a porosity of from about 0% to about 30% by volume of the compliant layer.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to methods for making environmental barrier coatings using sintering aids suitable for use with high temperature components.

More specifically, the EBCs described herein comprise sintering aids, which can lower the sintering temperature, thereby promoting the formation of dense EBC layers that can act as a hermetic seal to protect the underlying component from corrosion from the gases generated during high temperature combustion without damaging the component through exposure to high sintering temperatures, as explained herein below.

The EBCs described herein may be suitable for use in conjunction with CMCs or monolithic ceramics. As used herein, "CMCs" refers to silicon-containing matrix and reinforcing materials. Some examples of CMCs acceptable for use herein can include, but should not be limited to, materials having a matrix and reinforcing fibers comprising silicon carbide, silicon nitride, and mixtures thereof. As used herein, "monolithic ceramics" refers to materials comprising silicon carbide, silicon nitride, and mixtures thereof. Herein, CMCs and monolithic ceramics are collectively referred to as "ceramics."

As used herein, the term "barrier coating(s)" can refer to environmental barrier coatings (EBCs). The barrier coatings herein may be suitable for use on "ceramic component," or simply "component" 10 found in high temperature environments (e.g. operating temperatures of above 2100° F. (1149° C.)), such as those present in gas turbine engines. Examples of such ceramic components can include, for example, combustor components, turbine blades, shrouds, nozzles, heat shields, and vanes.

Figure 1:
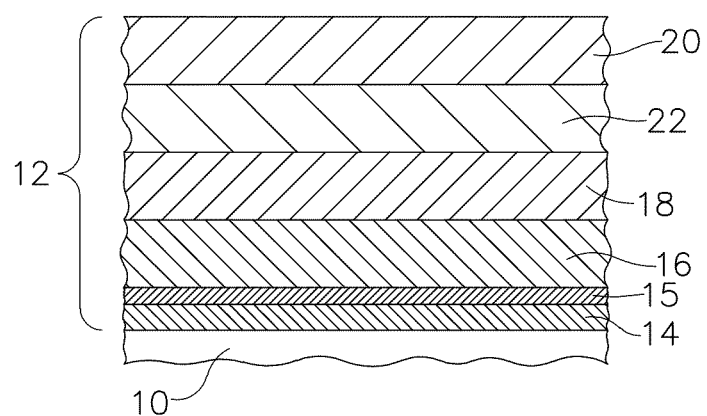
FIG. 1 is a schematic cross sectional view of one embodiment of a component having and environmental barrier coating in accordance with the description herein.

More specifically, EBC 12 may comprise a coating system including various combinations of the following: a bond coat layer 14, an optional silica layer 15, at least one transition layer 16, an optional compliant layer 18, an optional intermediate layer 22, and an optional outer layer 20, as shown generally in FIG. 1 and as set forth herein below.

Bond coat layer 14 may comprise silicon metal, silicide, or a combination thereof, and may generally have a thickness of from about 0.1 mils to about 100 mils (about 2.5 to about 150 micrometers). Due to the application method as described herein below, there may be some local regions where the silicon bond coat is missing, which can be acceptable. For example, in one embodiment, bond coat layer can cover about 100% of the surface of component 10, and in another embodiment, about 90% or more of the surface area of the component.

As used herein "silicide" may include rare earth (Ln) silicides, chromium silicide (e.g. $CrSi_3$), niobium silicide (e.g. $NbSi_2$, $NbSi_3$), molybdenum silicide (e.g. $MoSi_2$, $Mo_5Si_3$, $MoSi_3$), tantalum silicide (e.g. $TaSi_2$, $TaSi_3$), titanium silicide (e.g. $TiSi_2$, $TiSi_3$), tungsten silicide (e.g. $WSi_2$, $W_5Si_3$), zirconium silicide (e.g. $ZrSi_2$), hafnium silicide (e.g. $HfSi_2$), As used herein, "rare earth" represented "(Ln)" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof.

Silica layer 15 can be amorphous or crystalline, and have an initial thickness of from about 0.0 mils to about 0.2 mils (about 0.0 to about 5 micrometers). However, the thickness of silica layer 15 can increase over time. Specifically, the silicon of bond coat layer 14 can oxidize slowly during the service life of the EBC to gradually form silica layer 15. The oxidation of bond coat 14 can protect the underlying ceramic component from oxidation, since the bond coat is oxidized rather than the ceramic component. Silica layer 15 can, in some embodiments, also be doped with a doping composition, as defined herein below, due to diffusion of the sintering aid into the silica layer.

Transition layer 16 may comprise a rare earth disilicate, a doped rare earth disilicate, or a doped rare earth disilicate containing secondary materials, as defined below. More specifically, transition layer 16 may include from about 85% to about 100% by volume of the transition layer of a primary transition material and up to about 15% by volume of the transition layer of a secondary material, and in one embodiment from about 85% to about 99% by volume of the transition layer of the primary transition material and from about 1% to about 15% by volume of the transition layer of the secondary material. In another embodiment, transition layer 16 may comprise 100% primary transition material wherein the primary transition material can be doped, as described below.

As used herein, "primary transition material" refers to a rare earth disilicate ($Ln_2Si_2O_7$), or a doped rare earth disilicate. As used herein, "doped rare earth disilicate" refers to $Ln_2Si_2O_7$ doped with a "doping composition" selected from the group consisting of iron (Fe), aluminum (Al), titanium (Ti), gallium (Ga), nickel (Ni), boron (B), an alkali, an alkaliearth, and Lnb rare earths, as defined herein below. As used herein throughout, "secondary material" refers to a material comprising a doping composition (as defined previously), and specifically, can be selected from the group consisting of $Fe_2O_3$, iron silicates, rare earth iron oxides, $Al_2O_3$, mullite, rare earth aluminates, rare earth aluminosilicates, $TiO_2$, rare earth titanates, $Ga_2O_3$, rare earth gallates, NiO, nickel silicates, rare earth nickel oxides, Lnb metals, $Lnb_2O_3$, $Lnb_2Si_2O_7$, $Lnb_2SiO_5$, borosilicate glass, alkaline earth silicates, alkaline earth rare earth oxides, alkaline earth rare earth silicates, and mixtures thereof. Any doping composition present in the primary material should correspond to the doping composition contained in any secondary material present (e.g. Fe-doped $Ln_2Si_2O_7$ with $Fe_2O_3$ secondary material; Ti-doped $Ln_2Si_2O_7$ with $TiO_2$ secondary material; or Ni-doped $Ln_2Si_2O_7$ with rare earth nickel oxide secondary material, for example).

Each transition layer 16 may have a thickness of from about 0.1 mils to about 40 mils (about 2.5 micrometers to about 1 millimeter), and may be made and applied to bond coat layer 14 as set forth below. In one embodiment, there may be more than one transition layer present. In such instances, each transition layer may comprise the same or different combination of primary transition materials and secondary materials. Transition layer 16 may have a porosity level of from 0% to about 30% by volume of the transition layer, and in another embodiment, from about 0.01% to about 30% by volume of the transition layer.

Similarly, outer layer 20 may comprise a rare earth monosilicate, a doped rare earth monosilicate, or a doped rare earth monosilicate containing secondary material. More specifically, outer layer 20 can include from about 85% to about 100% by volume of the outer layer of a primary outer material and up to about 15% by volume of the outer layer of the previously defined secondary material, and in one embodiment from about 85% to about 99% by volume of the outer layer of a primary outer material and from about 1% to about 15% by volume of the outer layer of the secondary material. In another embodiment, outer layer 20 may comprise 100% primary outer material wherein the primary outer material can be doped as described below.

As used herein, "primary outer material" refers to a rare earth monosilicate, or a doped rare earth monosilicate. As used herein, "doped rare earth monosilicate" refers to $Ln_2SiO_5$ doped with a doping composition, as defined previously. Outer layer 20 may have a thickness of from about 0.1 mils to about 3 mils (about 2.5 to about 75 micrometers), and may be made and applied to the underlying layer as set forth below. In one embodiment, outer layer 20 may have a porosity level of from 0% to about 30% by volume of the outer layer, and in another embodiment, from about 0.01% to about 30% by volume of the outer layer, and in another embodiment, from about 0.01% to about 15% by volume of the outer layer. In some embodiments, outer layer 20 can comprise cracks therein at a density of up to about 10 cracks/mm that can form during operation due to thermal expansion anisotropy.

In reference to the embodiments herein, "Lnb rare earth (metal)", or simply "Lnb" refers to a sub-set of rare-earth metals having a melting point below at least about 1450° C. including lanthanum, cerium, praseodymium, neodymium, promethium, samarium, europium, gadolinium, terbium, dysprosium, and ytterbium. In one embodiment, the sub-set can include only those rare earth elements having a melting point below about 1350° C. including lanthanum, cerium, praseodymium, neodymium, promethium, samarium, europium, gadolinium, and ytterbium. The Lnb rare earth metal can be utilized with SiC—SiC CMCs having an operation limit of about 1357° C.

As used herein throughout, "alkaline earth" can refer to magnesium (Mg), calcium (Ca), strontium (Sr), and barium (Ba). As used herein, "alkali" refers to lithium (Li), potassium (K), and sodium (Na). "Iron silicates" can include compounds such as $Fe_2SiO_4$, and glasses of rare earth iron silicates. "Rare earth iron oxides" can include compounds such as garnets ($Ln_3Fe_5O_{12}$), monoclinic ferrites ($Ln_4Fe_2O_9$), and perovskites ($LnFeO_3$). "Rare-earth aluminates" can include compounds such as garnets ($Ln_3Al_5O_{12}$), monoclinic aluminates ($Ln_4Al_2O_9$), and perovskites ($LnAlO_3$). "Rare earth aluminosilicates" can include glassy materials comprised of about 35-50wt % $Ln_2O_3$, about 15-25wt % $Al_2O_3$, and about 25-50wt % $SiO_2$. "Rare-earth titanates" can include compounds such as $Ln_2Ti_2O_7$ (pyrochlore) and $Ln_2TiO_5$. "Rare-earth gallates" can include compounds such as garnets ($Ln_3Ga_5O_{12}$), monoclinic gallates ($Ln_4Ga_2O_9$), perovskites ($LnGaO_3$), and $Ln_3GaO_6$. "Nickel silicates" can include compounds such as $Ni_2SiO_4$. "Borosilicate glass" can refer to any amorphous material containing up to about 15% by weight boron oxide ($B_2O_3$), up to about 10% alkali oxide selected from the group consisting of sodium ($Na_2O$), potassium ($K_2O$), lithium ($Li_2O$), or any combinations of thereof, up to about 10% alumina ($Al_2O_3$), and a balance of silica ($SiO_2$). "Alkaline earth silicates" can include compounds such as $Mg_2SiO_4$, $MgSiO_3$, $Ca_2SiO_4$, $Ca_3SiO_5$, $Ca_3Si_2O_7$, $CaSiO_3$, $Ba_2SiO_4$, $BaSiO_3$, $Ba_2Si_3O_8$, $BaSi_2O_5$, $Sr_2SiO_4$, and $SrSiO_3$. "Alkali earth rare earth oxides" can include compounds such as $BaLn_2O_4$, $Mg_3Ln_2O_6$, $SrLn_2O_4$, and $Sr_2Ln_2O_5$. "Alkaline earth rare earth silicates" can include oxyapatite materials (i.e. $Ae_2Ln_8Si_6O_{26}$).

If present, compliant layer 18 may include from about 85% to about 100% by volume of the compliant layer of a primary compliant material and up to about 15% by volume of the compliant layer of a secondary compliant material, and in one embodiment from about 85% to about 99% by volume of the compliant layer of a primary compliant material and from about 1% to about 15% by volume of the compliant layer of the secondary compliant material. In another embodiment, compliant layer 18 may comprise 100% by volume of the compliant layer of a primary compliant material wherein the primary compliant material may be doped with a rare earth element.

As used herein, "primary compliant material" refers to BSAS, or a rare earth doped BSAS, while "secondary compliant material" refers to $Ln_2O_3$, $Ln_2Si_2O_7$, $Ln_2SiO_5$, $Ln_3Al_5O_{12}$, $Al_2O_3$, mullite, and combinations thereof. Compliant layer 20 may have a thickness of from about 0.1 mils to about 40 mils (about 2.5 micrometers to about 1 millimeter), and may be made and applied as set forth below. In one embodiment, compliant layer 18 may have a porosity level of from 0% to about 30% by volume of the compliant layer, and in another embodiment, from about 0.01% to about 30% by volume of the compliant layer, and in another embodiment, from about 0.01% to about 15% by volume of the compliant layer.

Intermediate layer 22, if present, can comprise the previously defined primary outer materials of rare earth monosilicate or doped rare earth monosilicate. Similar to the silica layer, intermediate layer 22 can form during the service life of the EBC. More specifically, high temperature steam penetrates the outer layer 20, and as the steam reacts with the primary transition material of the transition layer to volatilize SiO2, intermediate layer 22 can form.

By way of example, and not limitation, the EBC systems described herein may include in one embodiment, component 10, bond coat layer 14, and transition layer 16; in another embodiment, component 10, bond coat layer 14, transition layer 16, and outer layer 20; in another embodiment, component 10, bond coat layer 14, transition layer 16, compliant layer 18, and outer layer 20; in another embodiment, component 10, bond coat layer 14, transition layer 16, compliant layer 18, transition layer 16, and outer layer 20; in another embodiment, component 10, bond coat layer 14, silica layer 15, and transition layer 16; in another embodiment, component 10, bond coat layer 14, silica layer 15, transition layer 16, and outer layer 20; in another embodiment, component 10, bond coat layer 14, silica layer 15, transition layer 16, compliant layer 18, and outer layer 20; in another embodiment, component 10, bond coat layer 14, silica layer 15, transition layer 16, compliant layer 18, transition layer 16, and outer layer 20; in another embodiment, component 10, bond coat layer 14, transition layer 16, intermediate layer 22, and outer layer 20; in another embodiment, component 10, bond coat layer 14, silica layer 15, transition layer 16, intermediate layer 22, and outer layer 20; in another embodiment, component 10, bond coat layer 14, silica layer 15, transition layer 16, intermediate layer 22 (which can form during operation), and outer layer 20; and in another embodiment, component 10, bond coat layer 14, silica layer 15, transition layer 16, compliant layer 18, transition layer 16, intermediate layer 22 (which can form during operation), and outer layer 20. Such embodiments can be suitable for use in environments having a temperature up to about 1704° C. (3100° F.).

Alternately, the EBC system may comprise component 10, bond coat layer 14, transition layer 16, and compliant layer 18; and in another embodiment, component 10, bond coat layer 14, silica layer 15, transition layer 16, and compliant layer 18. Such embodiments can be suitable for use in environments having a temperature of up to about 1538° C. (2800° F.).

Those skilled in the art will understand that embodiments in addition to those set forth previously are also acceptable, and that not all of the layers need to be present initially, but rather, may form during engine operation.

The EBC can be made and applied in accordance with the description below.

Bond coat layer 14 may be applied by plasma spray processes, chemical vapor deposition processes, electron beam physical vapor deposition processes, dipping in molten silicon, sputtering processes, and other conventional application processes known to those skilled in the art.

As previously described, silica layer 15 can form during the service life of the EBC. Specifically, oxygen in the surrounding atmosphere can diffuse through any of the outer layer, compliant, and transition layer(s) present in the EBC and react with the silicon of bond coat layer 14 to form silica layer 15. Alternately, silica layer 15 may be intentionally deposited by chemical vapor deposition, plasma spray, slurry deposition, or other conventional method.

Similar to silica layer 15, intermediate layer 22 can also form during the service life of the EBC when high temperature steam reacts with transition layer 16, as previously described.

The manufacturing and application processes for transition layer 16, compliant layer 18 and outer layer 20 can consist of a slurry deposition cycle including sintering aids to lower the temperature needed to densify the layers. The slurry deposition cycle can generally include slurry formation, slurry application, drying, and sintering, with optional masking, leveling, sintering aid infiltration, mask removal, and binder burnout steps, as set forth below. Those skilled in the art will understand that slurries of varying compositions can be used to make EBC layers of varying composition and that multiple slurry deposition cycles can be used to build up the total thickness of a particular layer. Each layer can have the thickness set forth previously with the average thickness per slurry deposition cycle depending primarily on the slurry solids loading, sintering aid concentration, and number of dip, spray, or paint passes.

The slurries described in the embodiments herein can comprise various slurry components, but generally include water, ceramic particles, sintering aid, and organic processing aids. Particularly, the slurry may comprise from about 1 wt % to about 99.9 wt % water; from about 0 wt % to about 33 wt % of a dispersant; from about 0 wt % to about 7 wt % of a plasticizer; from about 0 wt % to about 1 wt % surfactant; from about 0 wt % to about 25 wt % slurry sintering aid if there is one sintering aid, or alternately, from about 0 wt % to about 79.9 wt % slurry sintering aid if there are two sintering aids present; and in another embodiment, from about 0.01 wt % to about 25 wt % slurry sintering aid if there is one sintering aid, or alternately, from about 0.01 wt % to about 79.9 wt % slurry sintering aid if there are two sintering aids present; from about 0.1 wt % to about 72 wt % of primary material; from about 0 wt % to about 1 wt % of a thickener; from about 0 wt % to about 20 wt % of a latex binder; and from about 0 wt % to about 11 wt % of a secondary additive for controlled dispersion.

More specifically, "dispersant" refers to polyacrylic acid, polyacrylic acid-polyethylene oxide copolymers, polyvinyl phosphoric acid, polymethacrylic acid, polyethylenimine, ammonium polyacrylate, ammonium polymethacrylate, sulfonated naphthalene formaldehyde condensate, polyvinyl sulfonic acid, and combinations thereof.

"Plasticizer" refers to ethylene glycol, diethylene glycol, triethylene glycol, tetraethylene glycol glycerol, glycerin, polyethylene glycol, and combinations thereof.

"Surfactant" refers to compositions selected from the group consisting of fluorocarbons, dimethylsilicones, and ethoxylated acetylenic diol chemistries (e.g. commercial surfactants in the Surfynol® series such as Surfynol® 420 and 502 (Air Products and Chemicals, Inc.)), and combinations thereof.

As used herein, "slurry sintering aid" can refer to sintering aid compositions suitable for inclusion in the slurry. In some embodiments, there can be from about 0 wt % to about 25 wt %, and in some embodiments from about 0.01 wt % to about 25 wt %, of a slurry sintering aid selected from iron oxide, gallium oxide, aluminum oxide, nickel oxide, titanium oxide, boron oxide, and alkaline earth oxides; carbonyl iron; iron metal, aluminum metal, boron, nickel metal, hydroxides including iron hydroxide, gallium hydroxide, aluminum hydroxide, nickel hydroxide, titanium hydroxide, alkaline earth hydroxides; carbonates including iron carbonate, gallium carbonate, aluminum carbonate, nickel carbonate, boron carbonate, and alkaline earth carbonates; oxalates including iron oxalate, gallium oxalate, aluminum oxalate, nickel oxalate, titanium oxalate; and "water soluble salts" including water soluble iron salts, water soluble gallium salts, water soluble aluminum salts, water soluble nickel salts, water titanium salts, water soluble boron salts, and water soluble alkaline earth salts. In the case of the compliant layer slurry, the "slurry sintering aid" may include rare earth nitrate, rare earth acetate, rare earth chloride, rare earth oxide, ammonium phosphate, phosphoric acid, polyvinyl phosphoric acid, and combination thereof.

In an alternate embodiment, the slurry can comprise from about 0 wt % to about 59.3 wt %, and in one embodiment from about 0.01 wt % to about 59.3 wt %, of an Lnb rare earth metal slurry sintering aid as defined previously herein, and from about 0 wt % to about 20.6 wt %, and in one embodiment from about 0.01 wt % to about 20.6 wt %, of a $SiO_2$ slurry sintering aid. In this embodiment, the Lnb and $SiO_2$ content can be held such that the mole ratio of Lnb to $SiO_2$ is about 1 to 1 for slurries containing rare earth disilicate primary transition material, and about 2 to 1 for slurries containing rare earth monosilicate primary outer material.

As used herein, "water-soluble iron salts" can include iron nitrate and iron acetate; "water-soluble gallium salts" can include gallium nitrate and gallium acetate; "water-soluble aluminum salts" can include aluminum nitrate and aluminum acetate; "water-soluble nickel salts" can include nickel nitrate and nickel acetate; "water-soluble titanium salts" can include titanium chloride; "water-soluble boron salts" can include boric acid and ammonium borate; and "water-soluble alkaline earth salts" can include $Mg(NO_3)_2$, $Ca(NO_3)_2$, $Sr(NO_3)_2$, $Ba(NO_3)_2$, $MgC_2H_3O_2$, $CaC_2H_3O_2$, $SrC_2H_3O_2$, and $BaC_2H_3O_2$.

As defined previously, the "primary material" can be selected from $Ln_2Si_2O_7$, $Ln_2SiO_5$, or BSAS depending on which layer is being made.

"Secondary additives for controlled dispersion" include citric acid, glycine, dextrose, sucrose, mannose, tartaric acid, oxalic acid, and combinations thereof.

"Thickener" refers to xanthan gum, polyethylene oxide, guar gum, polyacrylic acid, polyvinylpyrolidone, methylcellulose, and other cellulose derivatives, and combinations thereof.

"Latex binder" refers to polystyrene, polyvinyl alcohol, polyvinyl butyrol, styrene-butadiene copolymer, polyacrylic acid, polyacrylates, acrylic polymers, polymethyl methacrylate/polybutyl acrylate, polyvinyl acetate, polyvinyl malate, and natural latex rubber. Some examples of latex binders can include Rhoplex™ HA-8, Rhoplex™ HA-12, Pavecryl™ 2500 (Rohm and Haas).

Also, as used herein, "organic processing aids" refers to dispersants, plasticizers, secondary additives for controlled dispersion, thickeners, and latex binders present in the slurry. These organic processing aids are comprised primarily of carbon and other elements that volatilize during processing such that they are not present in the post-sintered coating.

The slurry can be formed by combining the previously described slurry components with mixing media in a container. The mixture can be mixed using conventional techniques known to those skilled in the art such as shaking with up to about a 1 inch (about 25.4 mm) diameter alumina or zirconia mixing media, ball milling using about a 0.25 inch to about a 1 inch (about 0.64 cm to about 2.54 cm) diameter alumina or zirconia mixing media, attritor milling using about a 1 mm to about a 5 mm diameter zirconia-based mixing media, planetary ball milling using from about a 1 mm to about a 5 mm diameter zirconia-based media, or mechanical mixing or stirring with simultaneous application of ultrasonic energy. The mixing media or ultrasonic energy can break apart any agglomerated ceramic particles in the slurry. Any mixing media present may then be removed by straining, for example.

If not added previously, any of the remaining slurry components may be added, in turn, along with mixing until the component dissolves, which is generally after about 5 to about 60 minutes.

Once all slurry components have been mixed, the slurry can be filtered through screens of varying mesh sizes to remove any impurities that may be present, such as after the initial mixing of the slurry or after use of the slurry to deposit coating layers. A 325 mesh screen, for example, can be used to filter out impurities having an average size of about 44 microns or greater.

After mixing and optional filtering, the slurry can be agitated indefinitely by slow rolling, slow mechanical mixing, or other like methods to avoid trapping air bubbles in the slurry. In one embodiment, the slurry may be refreshed by adding additional water to account for that which has evaporated during processing. Alternately, once mixed, the slurry can be set aside until needed for application. Those skilled in the art will understand that the previous embodiment sets forth one method for making the slurry compositions described herein, and that other methods are also acceptable, as set forth in the Examples below.

Optionally, masking can be applied to the ceramic component before the slurry is applied to prevent coating specific areas of the component. Masking may be carried out using conventional techniques known to those skilled in the art including, but not limited to, tapes, tooling, and paint-on adhesives.

Once all desired masking of the ceramic component is complete, the slurry can be applied to the component to produce a coated component. The slurry can be applied to the component (or on top of a previously applied layer) using any conventional slurry deposition method known to those skilled in the art, including but not limited to, dipping the component into a slurry bath, or painting, rolling, stamping, spraying, or pouring the slurry onto the component. In one embodiment, slurry application can be carried out in a humid environment to help prevent water evaporation that could change the slurry rheology, for example, during coating deposition onto a large batch of parts. In one embodiment, "humid environment" refers to greater than 50% relative humidity, in another embodiment greater than 70% relative humidity, and in yet another embodiment greater than 95% relative humidity, all at or near room temperature (about 20° C. to about 30° C.). Slurry application can be carried out manually or it may be automated.

Once the slurry has been applied to the component, and while the slurry is still wet, it may be leveled to remove excess slurry material. Leveling may be carried out using conventional techniques such as, but not limited to, spinning, rotating, slinging the component, dripping with or without applied vibration, or using a doctor blade, to remove excess slurry material. Similar to the slurry application, leveling can be conducted manually or it may be automated, and it can be carried out in a humid environment because if the slurry dries too quickly it can lead to defects in the coating during leveling.

Next, the coated component can be dried to produce a dried component. Drying may be carried out in ambient or controlled temperature and humidity conditions. In one embodiment, controlled temperature and humidity can be utilized to help maintain the integrity of the applied slurry coating. More particularly, in one embodiment, drying may be carried out at temperatures from about 5° C. to about 100° C., and in another embodiment, from about 20° C. to about 30° C., and at a humidity range of from about 10% relative humidity to about 95% relative humidity, in one embodiment from about 50% relative humidity to about 90% relative humidity, and in yet another embodiment from about 70% relative humidity to about 80% relative humidity.

After drying, any masking present may then be removed by peeling off tapes and adhesives, pyrolysis of tapes and adhesives, or removing multi-use tooling. Any rough edges remaining after masking removal may be scraped or cut away using a sharp or abrasive tool.

Next, burnout of the organic processing aids may be carried out by placing the dried component in an elevated temperature environment so that any bound water can be evaporated and the organic processing aids can be pyrolyzed. In one embodiment, burnout of the organic processing aids may be accomplished by heating the dried component at a rate of from about 1° C./min to about 15° C./min to a temperature of from about 400° C. to about 1000° C. and holding the component at this temperature for from about 0 to about 10 hours. In another embodiment, the coated component may be heated at a rate of from about 2° C./min to about 6° C./min to a temperature of from about 600° C. to about 800° C. and holding the component at this temperature for from about 0 to about 10 hours. In another embodiment, the hold time can be eliminated by slowly ramping up to the target temperature without holding, followed by ramping up or down to another temperature at a different rate. In another embodiment, binder burnout can occur rapidly by placing the coated component into a furnace heated to a temperature of from about 1000° C. to about 1400° C.

The dried component may then be sintered to produce a component comprising an environmental barrier coating. Sintering can serve to simultaneously densify and impart strength to the coating. Additionally, in the case of the transition and outer layers of the EBC, sintering can impart a hermetic seal against high temperature steam present in the engine environment. Sintering can be carried out using a conventional furnace, or by using such methods as microwave sintering, laser sintering, infrared sintering, and the like.

Sintering can be accomplished by heating the dried component at a rate of from about 1° C./min to about 15° C./min to a temperature of from about 1100° C. to about 1700° C. and holding the component at that temperature for from about 0 to about 24 hours. In another embodiment, sintering can be accomplished by heating the coated component at a rate of from about 5° C./min to about 15° C./min to a temperature of from about 1300° C. to about 1375° C. and holding the component at that temperature for from about 0 to about 24 hours. In another embodiment, sintering can occur rapidly by placing the coated component into a furnace heated to a temperature of from about 1000° C. to about 1400° C.

Binder burnout and sintering heat treatments may be carried out in an ambient air atmosphere, or in an inert gas atmosphere where the inert gas is selected from hydrogen, a noble gas such as helium, neon, argon, krypton, xenon, or mixtures thereof. In one embodiment, the inert gas atmosphere can be used in conjunction with Lnb and $SiO_2$ sintering aids so as not to convert the rare earth metal to an oxide before it melts. Maintaining the Lnb metal in a metal state can promote liquid phase sintering and subsequent reaction with the $SiO_2$.

In an alternate embodiment, all layers of the EBC can be applied, one on top of the other, before masking removal, organic processing aid burnout, and sintering are carried out. Those skilled in the art will understand that after application of each layer, the layer should be dried, or partially dried, before the application of the subsequent layer.

In another embodiment, the sintering aid does not need to be added directly to the transition or outer layer of the slurry to achieve the desired result. The sintering aid can be added to one layer of the EBC slurry and during sintering, the sintering aid can diffuse throughout the EBC slurry to the remaining layers. In another embodiment, a primary material slurry with no sintering aid can be densified by applying the layer, allowing it to dry, and then back infiltrating a sol-gel solution comprising a sintering aid prior to heat treatment as explained below.

Infiltration may allow for the densification of a thicker layer of EBC material at one time. Moreover, infiltration is a way to add more sintering aid after sintering if the coating isn't as dense as desired. The sol-gel solution used for infiltration may be an aqueous solution of a water soluble salt sintering aid, as defined previously, or a solution of an organic solvent and a solvent soluble salt sintering aid.

As used herein, "organic solvent" refers to methanol, ethanol, propanol, butanol, pentanol, hexanol, heptanol, octanol, nonanol, decanol, dodecanol, acetone, methyl isobutyl ketone (MIBK), methyl ethyl ketone (MEK), toluene, ethylbenzene, propyl benzene, methoxybenzene, heptane, octane, nonane, decane, xylene, mineral spirits, naptha (such as VM&P naptha), tetrahydrofuran, ethers, and combinations thereof.

As used herein, "solvent soluble salt sintering aids" can include solvent soluble iron salts, solvent soluble gallium salts, solvent soluble aluminum salts, solvent soluble nickel salts, solvent soluble titanium salts, solvent soluble boron salts, and solvent soluble alkaline earth salts. More specifically, as used herein, "solvent-soluble iron salts" can include ethoxide, iron 2,4-pentanedionate, and iron tetramethylheptanedionate; "solvent-soluble gallium salts" can include gallium 8-hydroxyquinolinate, gallium 2,4-pentanedionate, gallium ethoxide, gallium isopropoxide, and gallium 2,2,6,6-tetramethylheptanedionate; "solvent-soluble aluminum salts" can include butoxide, aluminum di-s-butoxide ethylacetoacetate, aluminum diisopropoxide ethylacetoacetate, aluminum ethoxide, aluminum ethoxyethoxyethoxide, aluminum 3,5-heptanedionate, aluminum isopropoxide, aluminum 9-octadecenylacetoacetate diisopropoxide, aluminum 2,4-pentanedionate, aluminum pentanedionate bis(ethylacetoacetate), aluminum 2,2,6,6-tetramethyl3,5-heptanedionate, and aluminum phenoxide; "solvent-soluble nickel salts" can include nickel 2,4-pentanedionate, nickel 2,2,6,6-tetramethyl-3-5-heptanedionate; "solvent-soluble titanium salts" can include titanium allylacetoacetatetriisopropoxide, titanium bis(triethanolamine)diisopropoxide, titanium butoxide, titanium di-n-butoxide bis(2-ethylhexanoate), titanium diisopropoxide(bis-2,4-pentanedionate), titanium diisopropoxide bis(tetramethylheptanedionate, titanium ethoxide, titanium diisopropoxide bis(ethylacetoacetate), titanium 2-ethylhexoxide, titanium iodide triisopropoxide, titanium isobutoxide, titanium isopropoxide, titanium methacrylate triisopropoxide, titanium methacryloxyethylacetoacetate triisopropoxide, titanium methoxide, titanium methoxypropoxide, titanium methylphenoxide, titanium n-nonyloxide, titanium oxide bis(pentanedionate), titanium oxide bis(tetramethylheptanedionate), and titanium n-propoxide; "solvent-soluble boron salts" can include boron ethoxide, boron butoxide, boron isopropoxide, boron methoxide, boron methoxyethoxide, boron n-propoxide; and "solvent-soluble alkaline earth salts" can include calcium isopropoxide, calcium methoxyethoxide, calcium methoxide, calcium ethoxide, strontium isopropoxide, strontium methoxypropoxide, strontium 2,4-pentanedionate, strontium 2,2,6,6-tetramethyl-3,5-heptanedionate, magnesium ethoxide, magnesium methoxide, magnesium methoxyethoxide, magnesium 2,4-pentanedionate, magnesium n-propoxide, barium isopropoxide, barium methoxypropoxide, barium 2,4-pentanedionate, barium 2,2,6,6-tetramethyl-3,5-heptanedionate.

As used herein, "sintering aid(s)" refers to any of a "slurry sintering aid," a "water soluble sintering aid," or a "solvent soluble salt sintering aid," as defined previously. Without intending to be limited by theory, the inclusion of sintering aids to the EBC embodiments herein can increase the rate of diffusion of the primary material such that surface area reduction (i.e. high surface area particles consolidating to form a dense coating) can occur at lower temperatures than it would have absent the sintering aid. As previously described, sintering at lower temperatures (i.e. about 1357° C. or below) can not only result in a highly dense (i.e. greater than about 85% for the transition layer, greater than about 70% for the compliant layer, and greater than about 70% for the outer layer) coating that can be less susceptible to the penetration of hot steam from the engine environment, but can also help prevent the degradation of the mechanical properties of the underlying component that could result from prolonged exposure to higher temperatures.

Sintering aids can act in a variety of ways depending on the amount of sintering aid included in the EBC and the time at which the coating is exposed to sintering temperatures. For example, in one embodiment, the sintering aid can dissolve completely into the primary material (i.e. primary transition, outer, or compliant, materials) to "dope" the material. In another embodiment, if the amount of sintering aid that is soluble in the primary material is exceeded, the remaining insoluble portion of sintering aid can react with the primary material to form the secondary material (i.e. secondary transition, compliant, or outer material). In another embodiment, primary material and secondary material can be present as described previously, along with residual sintering aid.

In these latter two embodiments, when the secondary material is highly volatile in high temperature steam, such as but not limited to, alkali silicates, alkaline earth silicates, mullite, iron silicate, borosilicate glass, nickel silicate, and residual sintering aids of iron, aluminum, titanium, gallium, nickel, boron, alkali, and alkali-earth compounds, as long as the total volume of secondary material, plus porosity (plus residual sintering aid when present) in either of the intermediate layer or compliant layer (when present) of the EBC remains about 15% by volume or less, the hermetic seal can be maintained. Alternately, in these latter two embodiments, when the secondary material is highly resistant to volatilization in high temperature steam, such as when the secondary material comprises a rare earth containing compound, such as but not limited to rare earth oxide, rare earth titanate, rare earth iron compound, rare earth gallate, rare earth aluminate, and rare earth aluminosilicate, the porosity in either of the intermediate or compliant layer (when present) of the EBC need remain about 15% by volume or less to maintain the hermetic seal.

It should be noted that at low levels of sintering aid, the densified coating layer might not initially include any detectable secondary materials. In some embodiments, the secondary materials may never become detectable. In other embodiments, however, after hours of exposure to high temperature steam in the engine environment, the secondary materials can become detectable using techniques such as x-ray diffraction, electron microscopy, electron dispersive spectroscopy, and the like.

EBC embodiments described herein can offer a variety of benefits over current EBCs and manufacturing processes thereof. Specifically, as previously described, the inclusion of a sintering aid in the EBC embodiments herein can permit sintering at lower temperatures (i.e. about 1357° C. or below). This can result in a highly dense (i.e. greater than about 85% for the transition layer, and greater than about 70% for each of the outer, and compliant, layers) coating that can be less susceptible to the penetration of hot steam from the engine environment, and can also help prevent the degradation of the mechanical properties of the underlying component that could result from prolonged exposure to higher temperatures. Also, the embodiments set forth herein can be made at less expense than current EBCs due to the use of the slurry deposition process, which is made possible by the incorporation of sintering aids into the various layers. Moreover, the present embodiments can provide for EBCs having a more uniform thickness than conventional techniques, such as plasma spraying, even when applying thin layers (<2 mils or less than about 50 micrometers). Additionally, the slurry deposition process can allow for the application of the EBCs to internal component passages as well as the ability to produce smooth surface finishes without an additional polishing step.

There can be occasions when the EBC develops small and/or narrow defects (e.g. about 10 microns to about 5 mm in diameter; or about 10 microns to about 1 mm in width) that need to be repaired. The following repair processes are applicable to the EBCs described herein and may be carried out after sintering of an individual EBC layer, or after sintering the entire applied EBC, as explained herein below.

In one embodiment, repairs may include remedying defects in one or more individual layers as the EBC is being applied using the methods described herein. In this embodiment, the repair can be carried out after sintering a given layer by applying a repair slurry comprising the same slurry materials used to make the layer having the defects. For example, if the transition layer develops a defect after sintering, the defect could be repaired using a "transition layer repair slurry" that comprises the same transition layer slurry materials used in the original application of the transition layer. In one embodiment, the repair slurry can comprise a higher solids loading of primary material ceramic particles than the original slurry layer as this can reduce shrinkage on drying and sintering of the repaired portion of the coating. In particular, the solids loading of primary material ceramic particles in the repair slurry can be greater than about 30% to about 55% by volume (as opposed to greater than about 10% by volume in one embodiment of the original slurry, and from about 10% to about 55% by volume in another embodiment of the original slurry used to make the layer). The repair slurry may be applied using any conventional method including those described previously, and the resulting "repair(ed) coating" may then be processed as described previously herein before application of any subsequent layer of the EBC.

In an alternate embodiment, repairs may include fixing defects after application and sintering of the entire EBC. In this embodiment, the repair may be carried out on the EBC having defects using a transition layer repair slurry comprising the same materials present in the previously defined transition layer slurry (i.e. primary transition material, a sintering aid, and optionally secondary material). This particular repair slurry can seep into any defects present in the EBC and provide a hermetic seal to the repaired EBC coating after sintering. Again, the solids loading of the transition layer repair slurry may comprise upwards of about 30% to 55% by volume.

Additionally, repair processes may be used to reduce surface roughness of a plasma sprayed EBC having any composition. Specifically, if the surface roughness of a plasma sprayed EBC is unacceptable the coating can be smoothed over by applying the previously described transition layer slurry or outer layer slurry. When applied over the plasma sprayed EBC, the transition layer slurry or outer layer slurry can fill in any gaps, grooves, or uneven portions of the plasma sprayed coating and reduce the surface roughness to an acceptable degree. More specifically, depending on the thickness of the transition layer slurry or outer layer slurry, surface roughness of the plasma sprayed EBC can be reduced from greater than 200 micro inch (about 5 micrometers) Ra, to between 40 micro inch Ra and 200 micro inch (about 1 to about 5 micrometers) Ra in one embodiment, and from between 40 micro inch Ra to 150 micro inch (about 1 to about 3.8 micrometers) Ra in another embodiment. In one embodiment, the transition layer slurry or outer layer slurry can comprise a thickness of at least about 0.5 mils (about 12.5 micrometers), and in another embodiment from about 0.5 mils to about 3 mils (about 12.5 to about 75 micrometers). The applied transition layer slurry can then be processed as described previously to produce a repaired EBC having an acceptable surface roughness. Additional slurry layers may be applied to the EBC if desired.

Such repair processes can provide the ability to repair localized defects, at varying points during the application or life of the coating, as opposed to stripping off and reapplying the entire coating. This, in turn, can result in a savings of time, labor, and materials.

EXAMPLE

Example 1

A silicon bond coat was applied to a SiC—SiC CMC using a conventional air plasma spray process. Next, a primary transition material slurry was made by first mixing yttrium disilicate powder, aluminum oxide powder, water, polyacrylic acid-polyethylene oxide copolymer, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was then added and the mixture was shaken for 15 minutes using a paint shaker. Finally, Rhoplex® HA8 emulsion was added and the container was placed back onto the roller mill for 1 hour (without media).

The resulting primary transition material slurry (Slurry A) consisted of 65.87% yttrium disilicate (primary transition material), 4.85% aluminum oxide (sintering aid), 6.59% polyacrylic acid-polyethylene oxide copolymer (dispersant), 0.08% Surfynol 502® (surfactant), 0.13% xanthan gum (thickener), 4.08% Rhoplex® HA8 emulsion (latex), 2.78% glycerin (plasticizer), and the balance water (all percents by weight). The silicon-coated ceramic component was dipped into Slurry A, dried in ambient conditions, and heat-treated at 3° C./minute to 1000° C. to burn out the binder. Then, the component was sintered by heating the component at 5° C./minute from 1000° C. to 1344° C. and holding for 5 hours to form the transition layer.

Next, a primary compliant material slurry was made by first mixing BSAS powder, yttrium oxide powder, water, polyacrylic acid-polyethylene oxide copolymer, Surfynol 502®, and glycerin in a plastic container, along with enough 0.25 inch (6.35 mm) diameter, cylindrical alumina media to line the bottom of container. This mixture was placed on a roller mill for 15 hours. After taking the container off of the roller mill, the alumina media was removed. Xanthan gum was then added and the mixture was shaken for 15 minutes using a paint shaker. Finally, Rhoplex® HA8 emulsion was added and the container was placed back onto the roller mill for 1 hour (without media).

The resulting primary compliant material slurry (Slurry B) consisted of 44.62% BSAS (primary compliant layer material), 17.20% yttrium oxide (sintering aid), 6.18% polyacrylic acid-polyethylene oxide copolymer (dispersant), 0.10% Surfynol 502® (surfactant), 0.17% xanthan gum (thickener), 7.15% Rhoplex® HA8 emulsion (latex), 5.13% glycerin (plasticizer), and the balance water (all percents by weight). The silicon- and transition-layer coated ceramic component was dipped into Slurry B, dried in ambient conditions, and heat-treated at 3° C./minute to 1000° C. to burn out the binder. Then, the component was sintered by heating the component at 5° C./minute from 1000° C. to 1344° C. and holding for 5 hours to form the compliant layer.

Figure 2:
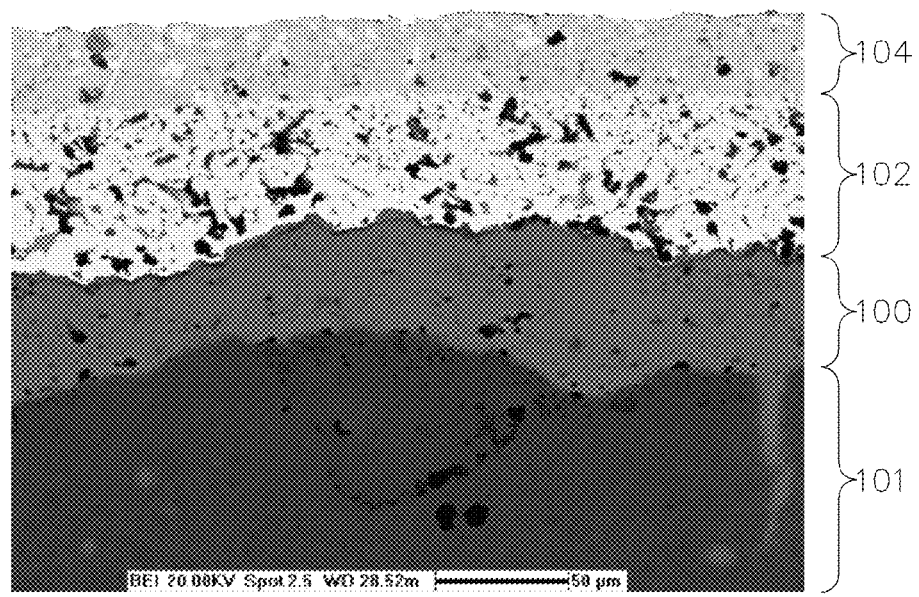
FIG. 2 is a SEM cross-section of an EBC coating on a SiC—SiC CMC in accordance with Example 1 herein.
Figure 3:
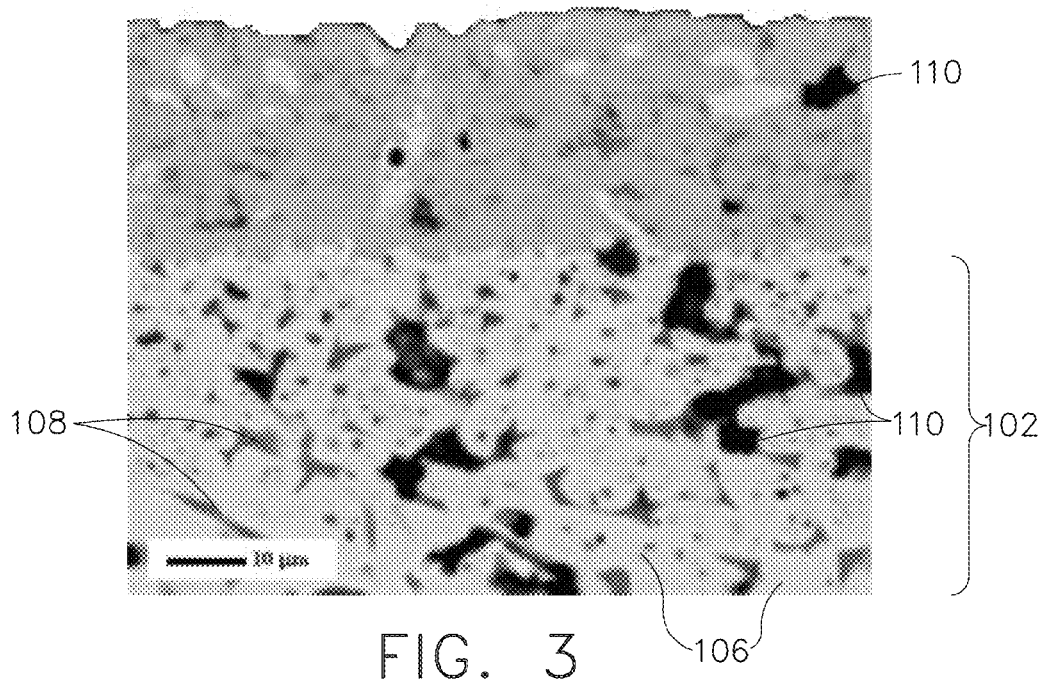
FIG. 3 is a close up view of FIG. 2 in accordance with Example 1 herein.

FIG. 2. shows a SEM micrograph of a CMC (101) having this coating microstructure with the air plasma spray silicon bond coat (100), transition layer (102), and compliant layer (104). The transition layer (102) is comprised of aluminum-doped yttrium disilicate primary material (106) (bright phase, see higher magnification SEM micrograph in FIG. 3), a mullite secondary material (108) (gray phase), and porosity (110) (black regions). The mullite secondary material is volatile in steam; thus, because the sum of the porosity and mullite content just exceeds 15% by volume, the transition layer is not likely a hermetic barrier to high temperature steam. The compliant layer, in this example, imparts hermeticity to the system. This layer contains yttrium-doped BSAS primary material (gray phase), yttrium disilicate steam secondary material (bright phase), mullite secondary material (dark gray phase), and porosity (black region). Here, only the mullite secondary material has high volatility in steam, and the combined amount of mullite and porosity is less than 15% by volume.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for making an environmental barrier coating using a sintering aid, the method comprising:
   applying a bond coat layer to a ceramic component;
   combining at least water, at least one slurry sintering aid, and a primary transition material comprising a rare earth disilicate to produce a transition layer slurry, the at least one slurry sintering aid containing at least one doping composition chosen from the group consisting of iron, aluminum, titanium, gallium, nickel, boron, alkali metals, alkaline-earth metals, and Lnb rare earth metals;
   optionally combining at least water and a primary outer material comprising a rare earth monosilicate or a doped rare earth monosilicate to produce an outer layer slurry;
   optionally combining at least water and a primary compliant material comprising BSAS or a rare earth doped BSAS to produce a compliant layer slurry;
   applying at least the transition layer slurry and optionally applying the outer layer slurry and/or the compliant layer slurry to the bond coat layer on the ceramic component; and
   sintering the ceramic component to produce the environmental barrier coating having at least the bond coat layer, a transition layer formed by the transition layer slurry, optionally an outer layer formed by the outer layer slurry, and optionally a compliant layer formed by the compliant layer slurry, the sintering step causing the at least one slurry sintering aid to dissolve into at least the primary transition material to form therein a doped rare earth disilicate containing the at least one doping composition, optionally any of the at least one slurry sintering aid that does not dissolve into the primary transition material forming a secondary material, the transition layer containing 0% to about 15% by volume of porosity.

2. The method of claim 1, wherein the sintering step comprises sintering the transition layer slurry to produce the transition layer prior to applying one or more of the outer layer slurry and the compliant layer slurry.

3. The method of claim 1, wherein the transition layer slurry, the outer layer slurry, and the compliant layer slurry are applied to the ceramic component to form the transition layer, the outer layer, and the compliant layer on the ceramic component.

4. The method of claim 3, wherein the compliant layer slurry is applied to the transition layer and sintered to produce the compliant layer prior to applying the outer layer slurry.

5. The method of claim 4 wherein the compliant layer comprises at least one defect after the sintering thereof, the method further comprising repairing the defect by:
applying a compliant layer repair slurry to the compliant layer defect; and
sintering the compliant layer repair slurry to produce a repaired compliant layer wherein the compliant layer repair slurry comprises a primary compliant material solids loading of at least about 30% to about 55% by volume.

6. The method of claim 4 wherein the environmental barrier coating comprises at least one defect in the outer layer after the sintering thereof, the method further comprising repairing the defect by:
applying a transition layer repair slurry to the outer layer defect of the environmental barrier coating; and
sintering the transition layer repair slurry to produce a repaired environmental barrier coating wherein the transition layer repair slurry comprises a primary transition material solids loading of at least about 30% to about 55% by volume.

7. The method of claim 3, wherein:
the combining step for producing the transition layer slurry comprises combining from about 1 wt % to about 99.9 wt % water; from about 0.1 wt % to about 72 wt % of the primary transition material; from about 0.1 wt % to about 25 wt % of the at least one slurry sintering aid; and optionally any organic processing aids;
the combining step for producing the outer layer slurry comprises combining from about 1 wt % to about 99.9 wt % water; from about 0.1 wt % to about 72 wt % of the primary outer material; and optionally any organic processing aids; and
the combining step for producing the compliant layer slurry comprises combining from about 1 wt % to about 99.9 wt % water; from about 0.1 wt % to about 72 wt % of the primary compliant material; and optionally any organic processing aids.

8. The method of claim 7 wherein the organic processing aids comprise:
from about 0 wt % to about 33 wt % dispersant;
from about 0 wt % to about 7 wt % plasticizer;
from about 0 wt % to about 1 wt % surfactant;
from about 0 wt % to about 1 wt % secondary additives for controlled dispersion;
from about 0 wt % to about 1.0 wt % thickener; and
from about 0 wt % to about 20 wt % latex binder.

9. The method of claim 7 further comprising a step of drying the ceramic component after the step of applying at least the transition layer slurry but prior to the sintering step, and further comprising a step of burning out the organic processing aids after the drying step but prior to the sintering step by heating the ceramic component at a rate of about 1° C/minute to about 15° C/minute to a temperature of about 400° C. to about 1000° C., and holding the ceramic component at that temperature for up to about 10 hours.

10. The method of claim 9 wherein the step of sintering the ceramic component after burning out the organic processing aids is accomplished by heating the ceramic component at a rate of about 1° C/minute to about 15° C/minute to a temperature of about 1100° C. to about 1700° C. and holding the ceramic component at that temperature for up to about 24 hours.

11. The method of claim 3, wherein the transition layer comprises a thickness of about 2.5 to about 1000 micrometers, the outer layer comprises a thickness of about 2.5 to about 75 micrometers, and the compliant layer comprises a thickness of about 2.5 to about 1000 micrometers.

12. The method of claim 1, wherein the at least one slurry sintering aid is selected from the group consisting of iron oxide, gallium oxide, aluminum oxide, nickel oxide, titanium oxide, boron oxide, alkaline earth oxides, carbonyl iron, iron metal, aluminum metal, boron, nickel metal, iron hydroxide, gallium hydroxide, aluminum hydroxide, nickel hydroxide, titanium hydroxide, alkaline earth hydroxides, iron carbonate, gallium carbonate, aluminum carbonate, nickel carbonate, boron carbonate, alkaline earth carbonates, iron oxalate, gallium oxalate, aluminum oxalate, nickel oxalate, titanium oxalate, water soluble iron salts, water soluble gallium salts, water soluble aluminum salts, water soluble nickel salts, water titanium salts, water soluble boron salts, and water soluble alkaline earth salts.

13. The method of claim 1, wherein the ceramic component comprises a ceramic matrix composite or a monolithic ceramic turbine engine component selected from the group consisting of combustor components, turbine blades, shrouds, nozzles, heat shields, and vanes.

14. The method of claim 1, wherein the transition layer comprises at least one defect after the sintering thereof, the method further comprising repairing the defect by:
applying a transition layer repair slurry to the transition layer defect; and
sintering the transition layer repair slurry to produce a repaired transition layer wherein the transition layer repair slurry comprises a primary transition material solids loading of at least about 30% to about 55% by volume.

15. The method of claim 1, wherein the transition layer comprises about 100% of the doped rare earth disilicate containing the at least one doping composition.

16. A method for making an environmental barrier coating using a sintering aid, the method comprising:
applying a bond coat layer to a ceramic component;
combining at least water, a primary transition material comprising a rare earth disilicate, and at least two slurry sintering aids each containing at least one doping composition to produce a transition layer slurry;
combining at least water and a primary outer material comprising a rare earth monosilicate to produce an outer layer slurry;
combining at least water and a primary compliant material comprising BSAS to produce a compliant layer slurry;
applying the transition layer slurry, the outer layer slurry, and the compliant layer slurry to the cermaic component; and
sintering the ceramic component to produce the environmental barrier coating having at least the bond coat layer, a transition layer formed by the transition layer slurry, an outer layer formed by the outer layer slurry, and a compliant layer formed by the compliant layer slurry, the sintering step causing the at least two slurry sintering aids to dissolve into at least one of the primary transition, primary outer and primary compliant materials to form at least one of a doped rare earth disilicate containing the at least one doping composition in the transition layer, a doped rare earth monosilicate containing the at least one doping composition in the outer layer, and a rare earth doped BSAS containing the at least one doping composition in the compliant layer, the transition layer containing 0% to about 15% by volume of porosity, and/or the outer layer containing 0% to about 30% by volume of porosity, and/or the compliant layer containing 0% to about 30% by volume of porosity.

17. The method of claim 16, wherein the sintering step comprises sintering the transition layer slurry to produce the transition layer prior to applying the outer layer slurry and the compliant layer slurry.

18. The method of claim 16, wherein the transition layer slurry, the outer layer slurry, and the compliant layer slurry are applied to the ceramic component and then sintered to form the transition layer, the outer layer, and the compliant layer on the ceramic component.

19. The method of claim 16, wherein the compliant layer slurry is applied to the transition layer and sintered to produce the compliant layer prior to applying the outer layer slurry.

20. The method of claim 16, wherein the at least two slurry sintering aids consist of a Lnb rare earth metal slurry sintering aid and a SiO2 slurry sintering aid, and wherein:

the combining step for producing the transition layer slurry comprises combining from about 1 wt % to about 99.9 wt % water; from about 0.1 wt % to about 72 wt % of the primary transition material; from about 0.1 wt % to about 59.3 wt % of the Lnb rare earth metal slurry sintering aid; from about 0.1 wt % to about 20.6 wt % of the $SiO_2$ slurry sintering aid and optionally any organic processing aids;

the combining step for producing the outer layer slurry comprises combining from about 1 wt % to about 99.9 wt % water; from about 0.1 wt % to about 72 wt % of the primary outer material; and optionally any organic processing aids; and the combining step for producing the compliant layer slurry comprises combining from about 1 wt % to about 99.9 wt % water; from about 0.1 wt % to about 72 wt % of the primary compliant material; and optionally any organic processing aids.

21. The method of claim 20 wherein the organic processing aids comprise:

from about 0 wt % to about 33 wt % dispersant;
from about 0 wt % to about 7 wt % plasticizer;
from about 0 wt % to about 1 wt % surfactant;
from about 0 wt % to about 1 wt % secondary additives for controlled dispersion;
from about 0 wt % to about 1.0 wt % thickener; and
from about 0 wt % to about 20 wt % latex binder.

22. The method of claim 20 further comprising a step of drying the ceramic component after the step of applying at least the transition layer slurry but prior to the sintering step, and further comprising a step of burning out the organic processing aids after the drying step but prior to the sintering step by heating the ceramic component at a rate of about 1° C/minute to about 15° C/minute to a temperature of about 400° C. to about 1000° C., and holding the ceramic component at that temperature for up to about 10 hours.

23. The method of claim 22 wherein the step of sintering the ceramic component after burning out the organic processing aids is accomplished by heating the ceramic component at a rate of about 1° C/minute to about 15° C/minute to a temperature of about 1100° C. to about 1700° C. and holding the ceramic component at that temperature for up to about 24 hours.

24. The method of claim 16, wherein the transition layer comprises a thickness of about 2.5 to about 1000 micrometers, the outer layer comprises a thickness of about 2.5 to about 75 micrometers, and the compliant layer comprises a thickness of about 2.5 to about 1000 micrometers.

25. The method of claim 16, wherein the ceramic component comprises a ceramic matrix composite or a monolithic ceramic turbine engine component selected from the group consisting of combustor components, turbine blades, shrouds, nozzles, heat shields, and vanes.

26. The method of claim 16, wherein the transition layer comprises at least one defect after the sintering thereof, the method further comprising repairing the defect by:

applying a transition layer repair slurry to the transition layer defect; and
sintering the transition layer repair slurry to produce a repaired transition layer wherein the transition layer repair slurry comprises a primary transition material solids loading of at least about 30% to about 55% by volume.

27. The method of claim 16, wherein the compliant layer comprises at least one defect after the sintering thereof, the method further comprising repairing the defect by:

applying a compliant layer repair slurry to the compliant layer defect; and
sintering the compliant layer repair slurry to produce a repaired compliant layer wherein the compliant layer repair slurry comprises a primary compliant material solids loading of at least about 30% to about 55% by volume.

28. The method of claim 16, wherein the environmental barrier coating comprises at least one defect in the outer layer after the sintering thereof, the method further comprising repairing the defect by:

applying a transition layer repair slurry to the outer layer defect of the environmental barrier coating; and
sintering the transition layer repair slurry to produce a repaired environmental barrier coating wherein the transition layer repair slurry comprises a primary transition material solids loading of at least about 30% to about 55% by volume.

29. The method of claim 16, wherein the transition layer comprises about 100% of the doped rare earth disilicate containing the at least one doping composition.

30. A method for making an environmental barrier coating using a sintering aid, the method comprising:

applying a bond coat layer to a ceramic component;
combining at least water and a primary transition material comprising a rare earth disilicate to produce a transition layer slurry;
combining at least water and a primary outer material comprising a rare earth monosilicate to produce an outer layer slurry;
combining at least water and a primary compliant material comprising BSAS to produce a compliant layer slurry;
applying at least the transition layer slurry, the outer layer slurry, and the compliant layer slurry to the ceramic component; and
sintering the ceramic component to produce the environmental barrier coating having at least the bond coat layer, a transition layer formed by the transition layer slurry, an outer layer formed by the outer layer slurry, and a compliant layer formed by the compliant layer slurry, at least the transition layer further comprising at least one slurry sintering aid containing at least one doping composition chosen from the group consisting of iron, aluminum, titanium, gallium, nickel, boron, alkali metals, alkaline-earth metals, and Lnb rare earth metals, the sintering step causing the at least one slurry sintering aid to dissolve into the primary transition material to form a doped rare earth disilicate containing the at least one doping composition, the transition layer containing 0% to about 15% by volume of porosity, and/or the outer layer containing 0% to about 30% by volume of porosity, and/or the compliant layer containing a combined amount of about 0% to about 30% by volume of porosity.

31. The method of claim 30, wherein the sintering step comprises sintering the transition layer slurry to produce the transition layer prior to applying one or more of the outer layer slurry and the compliant layer slurry.

32. The method of claim 30, wherein the transition layer slurry, the outer layer slurry, and the compliant layer slurry are applied to the ceramic component to form the transition layer, the outer layer, and the compliant layer on the ceramic component.

33. The method of claim 32, wherein the compliant layer slurry is applied to the transition layer and sintered to produce the compliant layer prior to applying the outer layer slurry.

34. The method of claim 32, wherein the transition layer comprises a thickness of about 2.5 to about 1000 micrometers, the outer layer comprises a thickness of about 2.5 to about 75 micrometers, and the compliant layer comprises a thickness of about 2.5 to about 1000 micrometers.

35. The method of claim 32, wherein:
the combining step for producing the transition layer slurry comprises combining from about 1 wt % to about 99.9 wt % water; from about 0.1 wt % to about 72 wt % of the primary transition material; from about 0.1 wt % to about 25 wt % of the at least one slurry sintering aid; and optionally any organic processing aids;
the combining step for producing the outer layer slurry comprises combining from about 1 wt % to about 99.9 wt % water; from about 0.1 wt % to about 72 wt % of the primary outer material; a second slurry sintering aid; and optionally any organic processing aids; and
the combining step for producing the compliant layer slurry comprises combining from about 1 wt % to about 99.9 wt % water; from about 0.1 wt % to about 72 wt % of the primary compliant material; a third slurry sintering aid; and optionally any organic processing aids;
wherein the at least one slurry sintering aid used with the transition layer slurry and the second slurry sintering aid of the outer layer slurry are selected from the group consisting of iron oxide, gallium oxide, aluminum oxide, nickel oxide, titanium oxide, boron oxide, alkaline earth oxides, carbonyl iron, iron metal, aluminum metal, boron, nickel metal, iron hydroxide, gallium hydroxide, aluminum hydroxide, nickel hydroxide, titanium hydroxide, alkaline earth hydroxides, iron carbonate, gallium carbonate, aluminum carbonate, nickel carbonate, boron carbonate, alkaline earth carbonates, iron oxalate, gallium oxalate, aluminum oxalate, nickel oxalate, titanium oxalate, water soluble iron salts, water soluble gallium salts, water soluble aluminum salts, water soluble nickel salts, water titanium salts, water soluble boron salts, and water soluble alkaline earth salts; and
wherein the third slurry sintering aid used with the compliant layer slurry is selected from the group consisting of rare earth nitrate, rare earth acetate, rare earth chloride, rare earth oxide, ammonium phosphate, phosphoric acid, polyvinyl phosphoric acid, and combination thereof.

36. The method of claim 32, wherein the at least one slurry sintering aid consists of two sintering aids in the form of a Lnb rare earth metal slurry sintering aid and a SiO2 slurry sintering aid, and wherein:
the combining step for producing the transition layer slurry comprises combining from about 1 wt % to about 99.9 wt % water; from about 0.1 wt % to about 72 wt % of the primary transition material; from about 0.1 wt % to about 59.3 wt % of the Lnb rare earth metal slurry sintering aid; from about 0.1 wt % to about 20.6 wt % of the $SiO_2$ slurry sintering aid and optionally any organic processing aids;
the combining step for producing the outer layer slurry comprises combining from about 1 wt % to about 99.9 wt % water; from about 0.1 wt % to about 72 wt % of the primary outer material; and optionally any organic processing aids; and
the combining step for producing the compliant layer slurry comprises combining from about 1 wt % to about 99.9 wt % water; from about 0.1 wt % to about 72 wt % of the primary compliant material; and optionally any organic processing aids.

37. The method of claim 30, wherein the ceramic component comprises a ceramic matrix composite or a monolithic ceramic turbine engine component selected from the group consisting of combustor components, turbine blades, shrouds, nozzles, heat shields, and vanes.

38. The method of claim 30, wherein the transition layer comprises at least one defect after the sintering thereof, the method further comprising repairing the defect by:
applying a transition layer repair slurry to the transition layer defect; and
sintering the transition layer repair slurry to produce a repaired transition layer wherein the transition layer repair slurry comprises a primary transition material solids loading of at least about 30% to about 55% by volume.

39. The method of claim 30, wherein the compliant layer comprises at least one defect after the sintering thereof, the method further comprising repairing the defect by:
applying a compliant layer repair slurry to the compliant layer defect; and
sintering the compliant layer repair slurry to produce a repaired compliant layer wherein the compliant layer repair slurry comprises a primary compliant material solids loading of at least about 30% to about 55% by volume.

40. The method of claim 30, wherein the environmental barrier coating comprises at least one defect in the outer layer after the sintering thereof, the method further comprising repairing the defect by:
applying a transition layer repair slurry to the outer layer defect of the environmental barrier coating; and
sintering the transition layer repair slurry to produce a repaired environmental barrier coating wherein the transition layer repair slurry comprises a primary transition material solids loading of at least about 30% to about 55% by volume.

41. The method of claim 30, wherein the transition layer comprises about 100% of the doped rare earth disilicate containing the at least one doping composition.

* * * * *